Patented Oct. 1, 1935

2,015,750

UNITED STATES PATENT OFFICE 2,015,750

MANUFACTURE OF CERAMIC WARE

Charles F. Geiger, Metuchen, N. J., assignor to The Carborundum Company, Niagara Falls, N. Y., a corporation of Pennsylvania No Drawing. Application July 3, 1933, Serial No. 678,923

11 Claims. (Cl. 25—156)

My invention relates to an improved process of drying a ceramic article in preparation for burning the same. One object of my invention is to shorten the time requisite for properly drying a ceramic article preparatory to placing it in a kiln to be burned.

In the ordinary method of making ceramic bodies such as porcelain articles, refractory brick and abrasive wheels, it is customary to mix the various ingredients together with a sufficient amount of water to render the mixture more or less plastic. A temporary binder may be included or not according to the ceramic article in prospect. The plastic mixture is then pressed or tamped into the desired shape; and the formed article is then very slowly and carefully dried preparatory to placing it in a kiln to be burned. The drying process is long and tedious, more particularly in the case of the more delicate type of bodies. In their case, drying is carried out over a long period of time, either in the open air at room temperature, or in a very humid atmosphere at a somewhat higher temperature. In the case either of drying in the open air or of drying in a very humid atmosphere, the temperature is ultimately raised slowly and carefully to a sufficient degree to evaporate the moisture, leaving the body quite dry. The length of time required for drying under these conditions is normally from four days to a week; or in the case of very large bodies, the drying period may extend through several weeks or even months, in the case of glass pots, glass tank block, chemical stoneware, etc. In the case of articles which are dried in a very humid atmosphere, the length of time required can not be substantially reduced because it is necessary as a preliminary step to heat the article in a hot atmosphere, so humid that practically no drying takes place, until the articles are uniformly heated through. It then becomes possible to slowly reduce the humidity of the surrounding atmosphere so that the moisture gradually leaves the articles.

A consideration of the methods normally employed in the fabrication and drying of most ceramic products will demonstrate the inadequacy of the usual practices involved. It is customary to form the ware with the mixture at room temperatures. Subsequently the molded or pressed shapes are given some air drying or are placed in a drier of one form or another and the temperature of the ware is gradually increased either by raising the temperature of the ambient gases or by progressively advancing the ware into the hotter zones of a tunnel drier. By any of these more or less standard procedures, the endeavor is to heat the formed shapes to some extent at least before any great amount of drying is allowed to take place. The chief difficulty is that the heating of the ceramic ware must proceed entirely from the outside faces in toward the center of the ware. Consequently, the approximate centers of each piece must be last to be brought up to the desirable temperature; but all this time, unless the drying apparatus is under absolute humidity control, some drying is taking place on the surface of the ware; and this proceeds in most cases before the center of the ware has received any substantial elevation of its temperature. The result, frequently, is a sort of case hardening effect which further decreases the rate at which water can be brought to the surface and evaporated therefrom.

In accordance with my improved procedure, a molded article is so produced as to be hot substantially uniformly to the center thereof before the drying step starts. Just what all of the underlying phenomena are which explain the improved drying obtained by my improved procedure I do not know. The theory which I now believe to be the most probable is that the moisture which is on the inside of the article does not make its way through dried portions of the article as readily as it does through portions which are still wet.

Refractory and abrasive articles, and others manufactured from relatively large percentages of non-plastic materials usually contain appreciable amounts of water-soluble temporary bonding materials such as sulphite-cellulose liquor or powder, dextrin, etc. I have found in my experiments that when the usual drying methods are followed a relatively large percentage of these water soluble bonds are carried to and concentrated at the surface in the dry state in the drying process. I find that this action automatically seals the pore spaces near the surface to a considerable extent, and thereby retards the rate of water flow to the surface, and, consequently, the rate of evaporation of the water. The preferred phenomenon in the drying of ware as generally accepted is that the flow of water from the center of the piece be at substantially the same rate at which it is evaporated from the surfaces. This is a function, of course, of a number of variables such as porosity, size and type of pore structure, permeability, as well as temperature of the different parts of the article. It is apparent, therefore, that the usual methods of drying, which rely upon heating the article from the outer faces inwardly, do not promote effective drying of bodies of the type under discussion.

Where a procedure is followed which results in a hard skin forming on the exterior of the article, moisture is held in the interior of the article so that there is a tendency for the surface to become cracked due to internal pressure generated by the moisture, thus resulting in weakening of the article. On the other hand, so long as the ceramic material is kept wet, water can pass through it readily, and the rate of drying is much faster. In the case of my improved procedure, the drying time for bodies which formerly took between 4 and 7 days in the drier is reduced to approximately as many hours.

While my invention is not limited in its broadest aspects to a particular manner of producing the hot molded article ready for drying, I prefer to produce a hot ceramic mixture and mold an article therefrom while maintaining the same in hot condition. This hot molded article may then be subjected while still hot to a dessicating atmosphere. Preferably, this dessicating atmosphere should be hot so as to speed up the drying process.

As illustrative of my invention I give the following examples:

A mixture of 92 parts of silicon carbide (14 and finer mesh), 8 parts of fireclay and 3 parts of a temporary binder such as cellulose sulphite pitch is made up at a temperature of about 80° C., and is then molded into blocks 9″ x 9″ x 7″. These blocks may be immediately placed in a hot dessicating atmosphere and dried in from 12 to 24 hours provided their temperature at no time falls below about 60° C.

A mixture of 50% clay and 50% grog is made up at about the same temperature and molded into blocks 9″ x 9″ x 7″. Such blocks may be immediately placed in a drier, the time required for complete drying being between 3 and 8 hours.

The expression "grog" is widely used in the ceramic industries, where it is understood to designate material which has been calcined for the purpose of sintering the fine particles to form coarser lumps and particularly to preshrink the material so that its volume will not decrease on firing thereafter in such a way as to cause cracking and disruption of the ceramic body in which the grog is incorporated. This calcination is accompanied by a hardening of the material and (particularly in the case of clays) by a marked decrease in its plasticity when mixed with water. In an extreme case where calcination was carried to the point of complete vitrification of clay for example, the resultant product would be as hard as ordinary commercial glass (i. e. 4 to 6 on Mohs' scale). Silicon carbide has a hardness over 9 on this same scale. My invention is not directly concerned with this factor of hardness, however, but is applicable to a wide variety of ceramic wares comprising clay or similar binders with or without accompanying non-plastic materials such as grog or silicon carbide.

The procedure which I prefer to follow is to first mix the dry ingredients together and then to heat the mixture, preferably both by the introduction of steam into the mix and by the external heating of the mixer chamber itself. Alternatively however the ingredients may be heated while dry, either before or during mixing, and hot fluid then added. This hot fluid may be added either as hot water or as steam, and should be as hot as conveniently possible. Mixing should preferably be done in a steam-jacketed mixer to prevent chilling during this step of the process. If the mixed ingredients must be stored while waiting to be formed or molded, storage should take place in a heated box.

As previously indicated my invention is not limited to the employment of steam as the heating medium for the mix. Other substances with suitable boiling points and latent heats of vaporization such as mercury, various organic materials, etc. may be employed in a heating jacket around the mixing machine and the water could be introduced into the mix as such. Also there are several methods by which the heating of either the dry or wet mix could be accomplished electrically, or otherwise, such as through the employment of a rotary drum suitably heated. In this form of the invention, steam or water may be introduced during or following the heating up of the material.

I prefer to accomplish forming in a hydraulic or other press, or by any one of several well known methods of hand or power molding or by jolting. The platens of the press and the press mold need not necessarily be heated if the pressing operation is rather rapid. Moreover, with a mold in constant service it receives sufficient heat from the successive batches of mix so as to be kept quite hot without supply of heat from another source. If on the other hand molding be effected by some other means such as tamping, it is desirable that the mold either be carefully insulated, steam-jacketed, or electrically or otherwise heated, in order to prevent undue loss of heat during the forming or molding step. After this step, the articles are taken directly from the molds and placed in a drier; and preferably there should be a fairly free circulation of air in the drier to permit moisture to be carried away. To obtain the full benefits of my improved process, air in the drier should be heated so as to speed up the drying process.

As has been above noted, it has been customary with certain types of articles to use a very humid atmosphere in the drier. For instance, drying may be started in an atmosphere of saturated steam, changing to steam which is progressively superheated so as to withdraw from the article the moisture contained within the same. It is to be understood that an atmosphere of this character is within the contemplation of my invention; and that my improved process shortens the time required for drying this type of article, inasmuch as the preliminary stage during which the article is heated by saturated steam so as to bring the article uniformly to the temperature of the steam is eliminated.

As a further improvement of the second stage, namely the drying step, of this invention, the desiccating action might proceed in a partial or fairly high vacuum, the pressure being materially below that of the surrounding atmosphere. This would lower the boiling point of the enclosed moisture and allow it to be removed very quickly. Experiments have demonstrated that certain types of 9 x 4½ x 2½″ standard brick for example can be dried within the very short space of one hour by such a procedure. In handling some materials with this combined hot mixing and evacuation system, it may be preferable to raise the temperature of the product still further to approximately the boiling point of the moistening medium present before evaporation is commenced after it has entered the drying chamber. This may be done by the introduction of high pressure steam or by other methods of heating. After the material is thus highly preheated, the pressure within the drying chamber is greatly reduced through the medium of a vacuum pump, for example, and drying proceeds at an extremely rapid rate.

As has been above mentioned, to obtain the desired results, I maintain the ceramic mixture and the article formed therefrom at a temperature of 50° C. or above, and preferably above 60° C. It is obvious that at atmospheric pressure the water in the mixture will tend to vaporize quite rapidly as the temperature of the mixture rises close to 100° C. I prefer therefore to maintain the temperature within the range of 50° C. to 100° C. until the articles are placed in the drier. In its broadest aspects however, my invention is not limited to a temperature as high as 50° C. as certain of its advantages are incidental to the placing of a hot molded article in a drier to dry the same. Thus, I have found that if the articles are in heated condition before drying is started, even though their temperature has not been raised raised to 50° C., there is a diminution of the time required for drying.

While I have above described in detail certain specific procedures by way of example, it is to be understood that my invention is not limited to the examples given, but may be otherwise practiced within the scope of the following claims.

I claim:

1. The steps in the process of making a ceramically bonded article from granules at least as hard as commercial glass with the addition of a small proportion of clay and a smaller proportion of water soluble temporary binder, which steps comprise heating the constituents in contact with steam, subsequently mixing said constituents and molding them under the physical conditions produced by so heating the constituents, and finally drying the molded article.

2. The steps in the process of making a ceramically bonded article which comprise heating granules at least as hard as commercial glass as well as small proportions of clay and of a temporary binder to over 50° C., mixing the constituents and molding the mix at temperatures in excess of 50° C., and drying the molded article in a hot desiccating atmosphere.

3. The steps in the process of making a ceramically bonded article which comprise assembling granules at least as hard as commercial glass with small percentages of clay and a water soluble carbonaceous binder, heating these constituents to over 50° C., adding water as a plasticizing material and mixing the constituents, and molding the mix while at temperatures in excess of 50° C.

4. The steps in the process of making a ceramically bonded article which comprise assembling granules at least as hard as commercial glass with small percentages of clay and a water soluble carbonaceous binder, heating these constituents to over 50° C., adding water as a plasticizing material, mixing the constituents and molding the mix while at temperatures in excess of 50° C., and drying the molded articles in a hot desiccating atmosphere.

5. The steps in the process of making a ceramically bonded article which comprise adding to a mass of tough granules at least as hard as commercial glass small percentages of clay and of a water soluble carbonaceous binder, plasticizing the mass by means of water, mixing the constituents and molding the mix while at temperatures in excess of 50° C., and drying the molded article in an atmosphere of superheated steam which is made progressively more superheated.

6. The steps in the process of making a ceramically bonded article which comprise adding to a mass of granules at least as hard as commercial glass small percentages of clay and of a water soluble carbonaceous bonding material plasticizing the mass by means of water, mixing the constituents and molding the mix while at temperatures in excess of 50° C., heating the molded article to the boiling point of the liquid contained therein, and drying the heated article by reduction of the pressure of the surrounding atmosphere.

7. The steps in the process of making a ceramically bonded article from non-plastic granules with the addition of a plastic binder, which steps comprise heating the constituents in contact with steam, subsequently mixing said constituents and molding them under the physical conditions produced by so heating the constituents, and finally drying the molded article.

8. The steps in the process of making ceramically bonded articles which comprise assembling granules of non-plastic refractory material along with clay in a steam-heated chamber, mixing the ingredients while steam is introduced into the mix being formed, rapidly molding the hot mix, and drying the molded bodies in a hot desiccating atmosphere.

9. The steps in the process of making ceramically bonded articles which comprise assembling silicon carbide grain with small proportions of clay and a carbonaceous temporary binder in a heated chamber, mixing the constituents and molding the mix while maintaining its temperature in excess of 50° C., and drying the molded articles in a hot desiccating atmosphere.

10. The steps in the process of making ceramically bonded articles which comprise placing silicon carbide grain and plastic bonding material in a heated chamber, mixing the constituents and molding the mix while maintaining its temperature in excess of 50° C., and drying the molded articles in a hot desiccating atmosphere.

11. The steps in the process of making ceramically bonded articles which comprise placing clay and grog in a heated chamber, mixing the constituents and molding the mix while maintaining its temperature in excess of 50° C., and drying the molded articles in a hot desiccating atmosphere.

CHARLES F. GEIGER.